3,123,629
DIHYDROCHRYSANTHEMIC ACID
INTERMEDIATES
Marc Julia, Paris, France, assignor to Societe des Usines Chimiques Rhone-Poulenc, Paris, France, a body corporate of France
No Drawing. Filed Dec. 7, 1959, Ser. No. 857,549
Claims priority, application France Dec. 6, 1958
15 Claims. (Cl. 260—456)

This invention relates to new intermediates for the preparation of (dl)trans-dihydrochrysanthemic acid and its esters, to a process for their preparation, and to a process for converting the said intermediates into the said acid and its esters.

It is known that dihydrochrysanthemic acid belongs, as does chrysanthemic acid, to a class of compounds certain esters of which are very interesting insecticides because of both their great activity and also their low toxicity to man and other warm-blooded animals. It is also known that these acids occur in two stereoisomeric forms, cis and trans, and that derivatives of the trans form are more active than the cis derivatives.

Up to the present, dihydrochrysanthemic acid has been prepared by the hydrogenation of chrysanthemic acid, itself obtained either by the hydrolysis of rethrins of natural origin or by the synthetic method of Staudinger et al. [Helv. Chim. Acta. (1924), 7, 390] modified by Campbell et al. [J. Chem. Soc. (1945), 283]. This synthesis, which, commencing with the reaction of ethyl diazoacetate with 2,5-dimethylhexa-2,4-diene, produces a mixture of (dl)cis- and (dl)trans-chrysanthemic acids, is however rather difficult because of the instability of ethyl diazoacetate. The resulting danger renders industrial application of the process very complicated. A similar synthesis, in which diazoacetonitrile replaces ethyl diazoacetate produces pure tran-chrystanthemic acid but presents even greater hazards.

The present invention provides new intermediates for the production of (dl)trans-dihydrochrysanthemic acid and a process for the synthetic production of the said acid which is completely free from all dangerous operations, and simpler than the process previously known.

The intermediates of the invention have the formula:

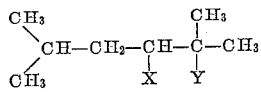     I where one of X and Y represents a halogen atom (preferably chlorine or bromine) or a reactive ester group (such, especially, as toluene-p-sulphonyloxy or methanesulphonyloxy) and the other represents a —CH₂CN or —CH₂COOR group (where R is a lower alkyl group, such as methyl or ethyl). Preferably either X represents a sulphonyloxy group as aforesaid and Y represents a —CH₂CN group, or X represents a —CH₂COOR group (where R is as hereinbefore defined) and Y represents a chlorine or bromine atom. The term "lower alkyl" is used herein to mean alkyl groups containing up to six carbon atoms.

According to a feature of the invention the intermediates of formula I are converted into derivatives of (dl)trans-dihydrochrysanthemic acid by ring-closure with an alkaline reagent, preferably with an alkali metal hydride, amide, or alkoxide in an inert solvent, such as an aromatic hydrocarbon or a lower aliphatic amide, with heating.

When the intermediate is one of Formula I in which X represents a sulphonyloxy group and Y represents the group —CH₂CN, sodamide in a tertiary lower aliphatic amide such as dimethylformamide or dimethylacetamide is preferably used as the alkaline reagent, whereas when in the intermediate Y represents a chlorine or bromine atom and X represents a —CH₂COOR group (where R is as hereinbefore defined), sodium t-butoxide or t-amoxide in an aromatic solvent such as benzene or toluene is preferred for the conversion.

The product of this reaction, which is a cyclopropane derivative of the formula:

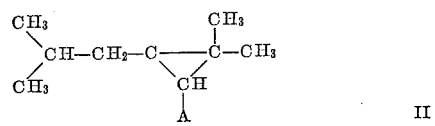     II (where A represents a cyano group or a —COOR group), is then converted into (dl)trans-dihydrochrysanthemic acid or a salt thereof by hydrolysis. Preferably the said acid is isolated by hydrolysis with caustic alkali followed by acidification.

According to a further feature of the invention, the intermediates of Formula I where one of X and Y is a —CH₂CN group are prepared by replacing the hydroxyl group in a compound of the formula:

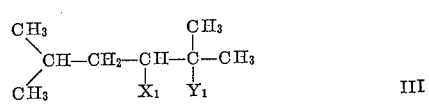     III (where one of X₁ and Y₁ is a —CH₂CN group and the other is a hydroxyl group) by a halogen atom or a reactive ester residue (such as a sulphonyloxy group) by known methods for achieving such a replacement of a hydroxyl group. Preferably the replacement is brought about with a sulphonyl halide in the presence of an organic base. The term "known methods" is used herein to mean methods heretofore used or described in the chemical literature.

According to yet a further feature of the invention, the intermediates of Formula I where one of X and Y is a —CH₂COOR group are prepared by the hydrolysis (or alcoholysis) of a lactone of the formula:

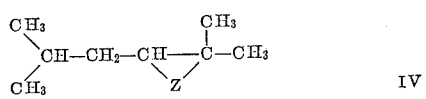     IV (where Z represents the group —CH₂COO—) with the simultaneous replacement of the alcoholic hydroxyl group liberated by a halogen atom or a reactive ester residue, and with simultaneous or subsequent esterification of the liberated carboxyl group. Preferably simultaneous hydrolysis, halogenation and esterification are brought about using a hydrogen halide in an alcohol of formula ROH. Alternatively, hydrolysis and chlorination may be effected with thionyl chloride, and subsequent esterification carried out by treating the reaction product with an alcohol of formula ROH.

The preparation of the intermediates of Formula I from easily obtainable starting materials via the compounds of Formulae III and IV may be represented by the following reaction schemes.

(a₁)

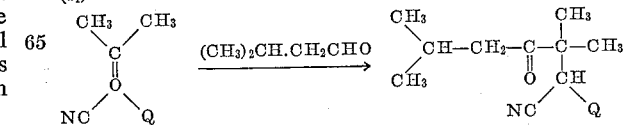

where Q is a hydrogen atom or a carboxylic ester group. Where Q is a carboxylic ester group it is converted into a hydrogen atom by hydrolysis and decarboxylation in manner known per se for the hydrolysis and decarboxylation of substituted cyanoacetic esters.

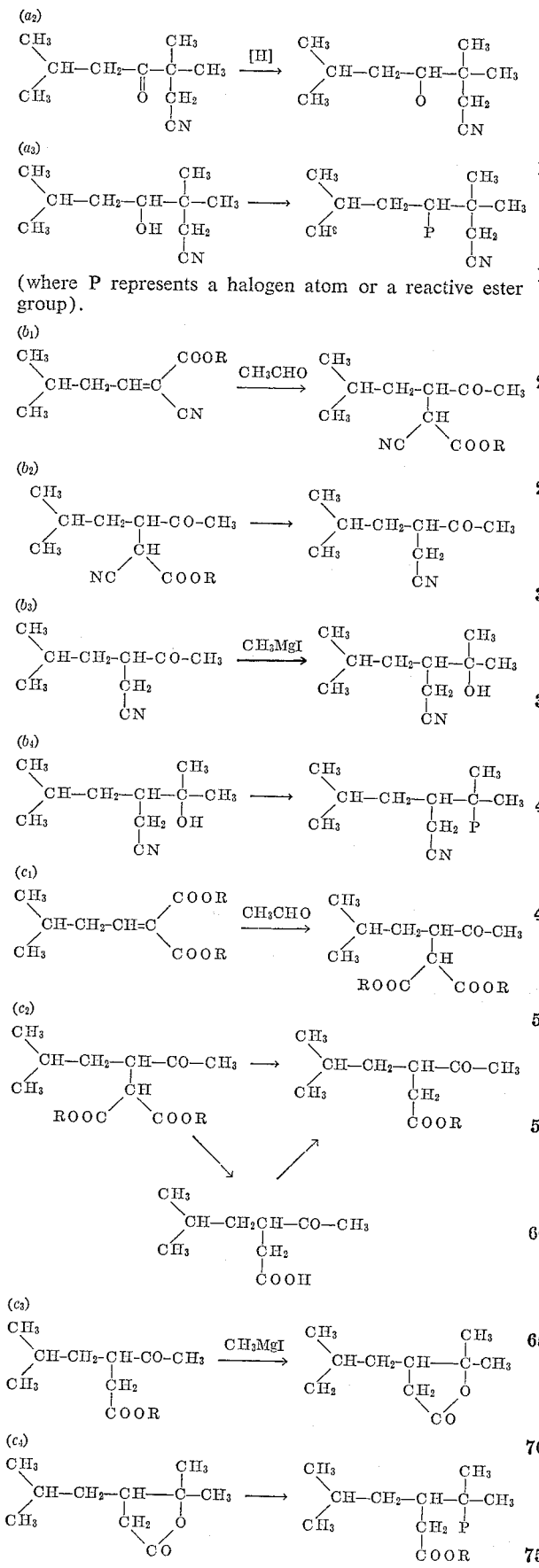
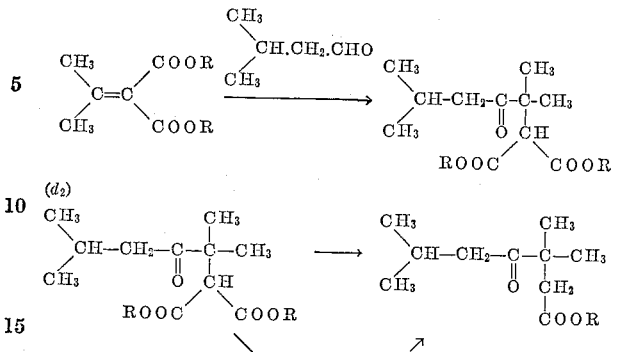
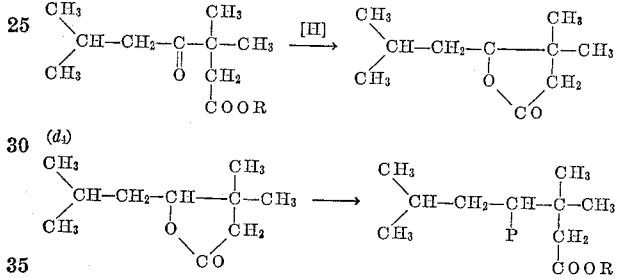

(where P represents a halogen atom or a reactive ester group).

Of these reactions, those marked $a_3$, $b_4$, $c_4$ and $d_4$ have already been discussed. The remainder can all be carried out in manner known per se and exemplary procedures are given in the examples below. The addition of aldehyde to a reactive double bond in reactions $a_1$, $b_1$, $c_1$ and $d_1$ is carried out in the presence of an acyl peroxide (e.g. benzoyl peroxide) as catalyst. The reduction step shown in $a_2$ must be carried out with a reagent that does not affect cyano groups; lithium aluminiumtributoxydride or potassium borohydride is preferred. Alternatively the reduction can be carried out by functional exchange with an alcohol using the Meerwein-Ponndorf method. The other reactions present no features of special difficulty.

The following examples illustrate the invention.

EXAMPLE I (dl) Trans-Dihydrochrysanthemonitrile 3,3,6-trimethyl-4-hydroxyheptanonitrile toluene-p-sulphonate (11 g.) is heated under reflux for 12 hours with sodamide (4.1 g.) in dimethylformamide (55 cc.). After cooling, the reaction mixture is poured onto ice and extracted with ether (5×60 cc.) After drying the ethereal solution over sodium sulphate and evaporating the solvent, (dl)trans-dihydrochrysanthemonitrile (4.9 g.) is obtained by distillation as a colourless, mobile liquid, B.P. 58–60° C./1 mm. Hg ($n_D^{20}$=1.4417).

3,3,6-trimethyl-4-hydroxyheptanonitrile toluene-p-sulphonate is obtained by the action of a solution of toluene-p-sulphony chloride in pyridine on 3,3,6-trimethyl-4-hydroxyheptanonitrile. After standing in a refrigerator for 48 hours, the mixture is poured onto ice. An oil forms which is decanted and which solidifies slowly, forming yellow crystals which, after recrystallisation from a mixture of ether and 35–50° petroleum ether, give a product, M.P. 78–79° C.

3,3,6-trimethyl-4-hydroxyheptanonitrile is itself produced by the reduction of the corresponding ketone, the reduction being effected in the following manner:

A solution of lithium aluminiumtributoxyhydride (64 g.; 0.25 mole) in tetrahydrofuran (80 cc.) is added with stirring at 0° C. to a solution of 3,3,6-trimethyl-4-oxo-heptanonitrile (35 g.; 0.209 mole) in anhydrous tetrahydrofuran (20 cc.). After standing at room temperature for 48 hours, the reaction mixture is poured onto ice, and acidified with 12 N hydrochloric acid (30 cc.). Ether is added and separated and the aqueous layer is extracted with ether. The combined ethereal solutions are washed with water, followed by a dilute solution of sodium bicarbonate and water again, and are then dried and evaporated. A colourless, oily liquid (28.5 g.) is obtained by distillation, B.P. 99–100° C./1 mm. Hg, which is shown by analysis to be 3,3,6-trimethyl-4-hydroxyheptanonitrile.

The preceding ketone can be prepared from ethyl isopropylidene-cyanacetate and isovaleraldehyde by the following process.

Isovaleraldehyde (430 g.; 5 mole) is refluxed under nitrogen with ethyl isopropylidenecyanacetate (153 g.; 1 mole), benzoylperoxide (10×2 g.) being added during the course of the reaction (48 hours). After it has been determined that no peroxide remains, the excess aldehyde is distilled off and the residue allowed to cool. Ether (400 cc.) is added and the organic solution is washed successively with sodium bicarbonate, sodium bisulphite and water. After drying over calcium chloride, ether is evaporated off and the residue distilled. A product is obtained (225 g.), B.P. 118° C./0.1 mm. Hg, $$n_D^{20} = 1.4480$$

which is shown by analysis to be ethyl 2-cyano-3,3,6-trimethyl-4-oxoheptanoate.

The ketonitrile ester (24 g.) thus obtained is allowed to stand overnight in contact with aqueous alcoholic potassium hydroxide solution composed of 85% potassium hydroxide (6.6 g.) in water (20 cc.) and ethanol (60 cc.), the temperature of the mixture being maintained at 0° C. The alcohol is then evaporated in vacuo and the residue acidified with 2 N hydrochloric acid to a pH below 1. The organic layer is then decanted and the aqueous layer extracted with ether. The combined organic solutions are dried over sodium sulphate and the solvent evaporated. The residue is heated for one hour at 120° C. under a pressure of 20 mm. Hg to effect decarboxylation and is then distilled. A product (9 g.) is obtained, B.P. 95–96° C./0.6 mm. Hg which, after recrystallisation from a mixture of ether and 60–80° petroleum ether melts at 120–120.5° C. Analysis shows the product to be 3,3,6-trimethyl-4-oxoheptanonitrile.

EXAMPLE II

*(dl)Trans-Dihydrochrysanthemonitrile*

Anhydrous pyridine (2 cc.) is added to 3,3,6-trimethyl-4-hydroxyheptanonitrile (5 g.) maintained at 0° C., followed slowly, with stirring, by methanesulphonyl chloride (3.7 g.). After standing overnight at 0° C. the mixture solidifies. Pyridine (2 cc.) is added, the mixture is poured onto ice and extracted with benzene and the benzene extracts are washed successively with 2 N hydrochloric acid, 2 N sodium hydroxide solution and water. The benzene solution is dried over sodium sulphate and the solvent removed. The crude ester obtained is dissolved in anhydrous dimethylformamide (25 cc.) and sodamide (2 g.) added. A vigorous reaction occurs and the reaction mixture is then refluxed for 12 hours. The mixture is then poured onto ice and extracted with ether. The ethereal solution is dried over sodium sulphate, evaporated and distilled. Trans-dihydrochrysanthemonitrile (3.1 g.) is obtained, identical with that of Example I.

The following process can be used to obtain 3,3,6-trimethyl-4-hydroxyheptanonitrile: a solution of potassium borohydride (8 g.) in water (80 cc.) is added, at 0° C., with stirring, over one hour, to a solution of 3,3,6-trimethyl-4-oxoheptanonitrile (8.5 g.; 0.05 mole) in methanol (50 cc.). Stirring is continued for five hours, the excess borohydride destroyed with dilute acetic acid and the product treated with ether. The ethereal layer is decanted and the aqueous layer extracted with ether. The combined ethereal solutions are treated as in Example I, and 3,3,6-trimethyl-4-hydroxyheptanonitrile (5 g.) is obtained.

The preceding ketone can itself be obtained by condensing dimethylacrylonitrile with isovaleraldehyde. The reaction can, for example, be carried out as follows: freshly distilled dimethylacrylonitrile (14 g.) is refluxed for 36 hours under a current of nitrogen with isovaleraldehyde (110 g.), benzoylperoxide (6 g. in all) being added from time to time. After ensuring that no peroxide remains, the excess isovalderaldehyde is distilled off and the residue cooled, diluted with ether and washed successively with aqueous sodium bicarbonate solution, sodium bisulphite solution and distilled water. After drying over calcium chloride, the ether is evaporated and the residue distilled under reduced pressure. Unchanged dimethylacrylonitrile (5.1 g.) is recovered, and 3,3,6-trimethyl-4-oxoheptanonitrile (6.1 g.) obtained.

EXAMPLE III

*(dl)Trans-Dihydrochrysanthemic acid*

Dihydrochrysanthemonitrile (0.8 g.) is refluxed for 24 hours with potassium hydroxide (1.2 g.) in glycol (20 cc.). After cooling, water (30 cc.) is added. The unsaponifiable material is extracted with ether and the remainder acidified to below pH 1 and extracted with ether. The ethereal solutions are re-extracted with saturated aqueous sodium bicarbonate solution (6×5 cc.). The bicarbonate extracts are acidified, extracted with ether (4×5 cc.), dried over sodium sulphate and the solvent evaporated. A very pale yellow oil (0.685 g.) remains which gives, on distillation, a colourless oil, B.P. 98–100° C./0.8 mm. Hg, $n_D^{21}=1.4478$, the infrared spectrum of which is identical with that of the product obtained by hydrogenation of a sample of (dl)trans-chrysanthemic acid obtained by synthesis.

EXAMPLE IV

*Ethyl(dl)Trans-Dihydrochrysanthemate*

A solution of 4,4-dimethyl-3-isobutyl-γ-butyrolactone (5 g.) in absolute ethanol (22 cc.) is saturated with dry gaseous hydrogen chloride and allowed to stand for 40 hours at laboratory temperature. Two thirds of the solvent are then evaporated in vacuo and the residue poured onto ice. The aqueous phase is saturated with sodium chloride, extracted with ether and the ethereal solution dried and the solvent evaporated.

A crude chloroester (4.2 g.) is thus obtained which is cyclized with double the theoretical quantity of a benzene solution of sodium t-amoxide (i.e. 20 cc. of a 2.2 N solution in benzene). The solution is boiled for four hours and allowed to stand overnight. Next day, water (5 cc.) is added and the product carefully extracted with ether.

Ethylenic products are removed from the ethereal extracts by shaking with a saturated solution of potassium permanganate. After separating and drying the organic layer, it is distilled and the ethyl ester of (dl) trans-dihydrochrysanthemic acid (1.9 g.), B.P. 108–111° C./16 mm. Hg, $n_D^{20}=1.4272$, is obtained. The lactone starting material can be prepared as follows: magnesium (6.85 g.) is reacted with methyl iodide (40 g.) in anhydrous ether (200 cc.). The solution obtained is added to a solution of ethyl 5-methyl-3-acetylhexanoate (46.5 g.) in benzene (300 cc.) at a rate such that the temperature does not rise above 0° C. The solution is then allowed to come to laboratory temperature over one hour and poured onto ice (200 g.) to which has been added concentrated sulphuric acid (16 cc.) and ammonium sulphate (60 g.). After decanting, the aqueous layer is extracted with ether and the organic layer is combined with the ethereal extract, washed with sodium bicarbonate solution, and dried, the solvent is evaporated and the residue distilled. The lactone (30 g.) is thus obtained, B.P. 83–87° C./0.6 mm. Hg, $n_D^{20.5}=1.4452$.

Ethyl 5-methyl-3-acetylhexanoate, B.P. 90° C./1–2 mm. Hg, is itself obtained by the esterification of 5-methyl-3-acetylhexanoic acid, which is prepared as follows: Ethyl isovalerylidenemalonate (160 g.) is heated for 72 hours in an autoclave at 90° C. with acetaldehyde (200 g.) in the presence of benzoyl peroxide (4 g. added initially, and 3×4 g. during the course of the first 48 hours).

After cooling, ether is added and the ethereal extract is washed with ferrous sulphate solution followed by sodium bicarbonate solution and water. After drying and evaporating the solvent, ethyl 5-methyl-3-acetyl-2-carbethoxyhexanoate (130 g.) is obtained by distillation, B.P. 107–110° C./0.4 mm. Hg. B.P. 80–81° C./0.06 mm. Hg, $n_D^{22}=1.4410$.

This diester (95 g.) is refluxed for eight hours with stirring with a solution of potassium hydroxide (95 g.) in methanol (750 cc.). After cooling, the thick mass is filtered and the filtrate concentrated to one fifth. The filter cake is dissolved in water, the concentrated methanolic solution added and then acidified. The organic acid thus liberated is extracted with ether and the ethereal solution dried. The dried product is heated at 100–120° C. under a pressure of 30 mm. Hg until no more gas is evolved. The product is then distilled under a pressure of 1 mm. Hg and 5-methyl-3-acetylhexanoic acid (46.5 g.) is obtained, B.P. 128–130° C./1.25 mm. Hg.

EXAMPLE V

*Ethyl(dl)Trans-Dihydrochrysanthemate*

4,4-dimethyl-3-isobutyl-γ-butyrolactone (5 g.), prepared as described in Example IV, is dissolved in anhydrous benzene (30 cc.). Thionyl chloride (5 cc.) is added and the solution refluxed for one hour. After cooling, the solution is poured into ethanolic hydrogen chloride (25 cc.) with stirring. The solutions are allowed to stand in contact for two and a half hours after which the solvents are evaporated and the chloro-ester distilled.

A colourless liquid (5 g.), B.P. 90° C./1 mm. Hg, $n_D^{25}=1.4435$, is obtained. The preceding chloro-ester (4 g.) is cyclised by boiling for four hours with a 2.2 N solution of sodium t-amoxide in benzene (20 cc.—double the theoretical quantity). The product is then allowed to stand overnight.

After treatment identical with that of Example IV, an ester (1.9 g.) is recovered, B.P. 110–115° C./20 mm. Hg, $n_D^{24.5}=1.4282$, the analysis of which is that of ethyl(dl)-trans-dihydrochrysanthemate.

EXAMPLE VI

*(dl)Trans-Dihydrochrysanthemic Acid*

Ethyl(dl)trans-dihydrochrysanthemate (2 g.) is saponified by heating in the presence of potassium hydroxide (1 g.) dissolved in methanol (15 cc.). (dl)Trans-dihydrochrysanthemic acid (1.070 g.) is thus obtained, identical with that obtained in Example III.

I claim:
1. A compound of the formula:

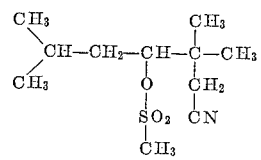

where one of X and Y is selected from the class consisting of chlorine, bromine, methanesulphonyloxy and toluene-p-sulphonyloxy groups and the other is selected from the class consisting of cyanomethyl and carbalkoxymethyl group of formula —CH₂COOR, where R is a lower alkyl group.

2. The compound of the formula:

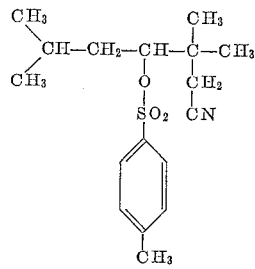

3. The compound of the formula:

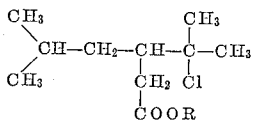

4. A compound of the formula:

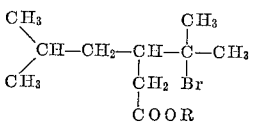

where R is a lower alkyl group.

5. A compound of the formula:

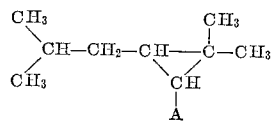

where R is a lower alkyl group.

6. Process for the preparation of a (dl)trans-dihydrochrysanthemic acid derivative of the formula:

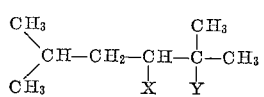

where A is selected from the group consisting of cyano groups and groups of formula —COOR, in which R is a lower alkyl group, which comprises subjecting a compound of the formula:

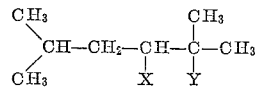

where one of X and Y is selected from the class consisting of chlorine, bromine, methanesulphonyloxy and toluene-p-sulphonyloxy groups and the other is selected from the class consisting of cyanomethyl and carbalkoxymethyl group of formula —CH₂COOR, where R is a lower alkyl group, to the action of an alkali metal derivative selected from the group consisting of alkali metal hydrides, amides and alkoxides in the presence of an organic diluent selected from the group consisting of aromatic hydrocarbons and amides of lower alkanoic acids.

7. Process according to claim 6 in which the said compound is heated under reflux with a solution of the said alkali metal derivative in an inert solvent.

8. Process for the preparation of (dl)trans-dihydrochrysanthemonitrile of the formula:

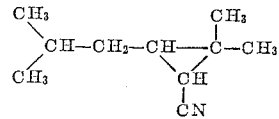

which comprises subjecting a compound of the formula:

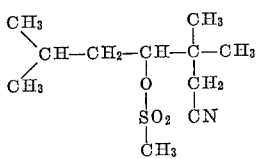

to the action of sodamide, in dimethylformamide as inert solvent.

9. Process according to claim 8 in which the said compound is heated under reflux with a solution of the sodamide in dimethylformamide.

10. Process for the preparation of (dl)trans-dihydrochrysanthemonitrile of the formula:

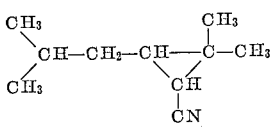

which comprises subjecting a compound of the formula:

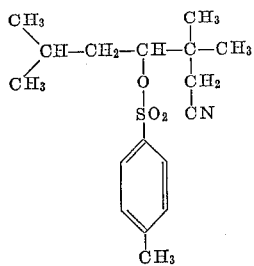

to the action of sodamide, in dimethylformamide as inert solvent.

11. Process according to claim 10 in which the said compound is heated under reflux with a solution of the sodamide in dimethylformamide.

12. Process for the preparation of an ester of (dl)trans-dihydrochrysanthemic acid of the formula:

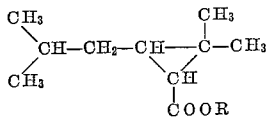

where R is a lower alkyl group, which comprises subjecting a compound of the formula:

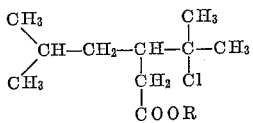

where R is a lower alkyl group to the action of an alkali metal derivative selected from the class consisting of sodium t-butoxide and t-amoxide, in benzene as insert solvent.

13. Process according to claim 12 in which the said compound is heated under reflux with a solution of an alkali metal derivative selected from sodium t-butoxide and t-amoxide in benzene.

14. Process for the preparation of an ester of (dl)trans-dihydrochrysanthemic acid of the formula:

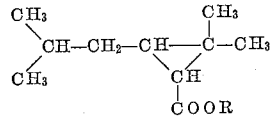

where R is a lower alkyl group, which comprises subjecting a compound of the formula:

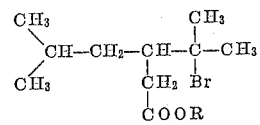

where R is a lower alkyl group to the action of an alkali metal derivative selected from the class consisting of sodium t-butoxide and t-amoxide, in benzene as inert solvent.

15. Process according to claim 14 in which the said compound is heated under reflux with a solution of an alkali metal derivative selected from sodium t-butoxide and t-amoxide in benzene.

References Cited in the file of this patent

UNITED STATES PATENTS

| | | |
|---|---|---|
| 2,240,275 | Whitmore | Apr. 29, 1941 |
| 2,653,963 | Cowen et al. | Sept. 29, 1953 |

FOREIGN PATENTS

| | | |
|---|---|---|
| 568,941 | Great Britain | Apr. 26, 1945 |